E. J. VON PEIN.
CREDIT CABINET.
APPLICATION FILED SEPT. 10, 1909.
1,134,248.
Patented Apr. 6, 1915.
5 SHEETS—SHEET 4.
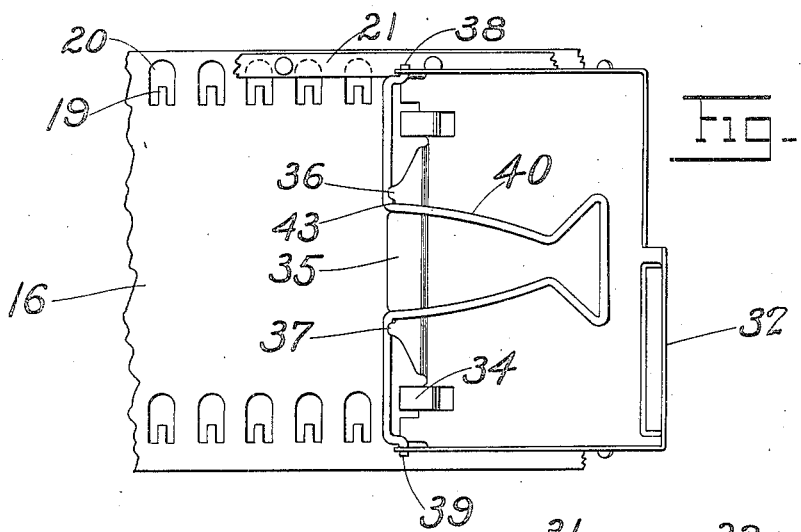
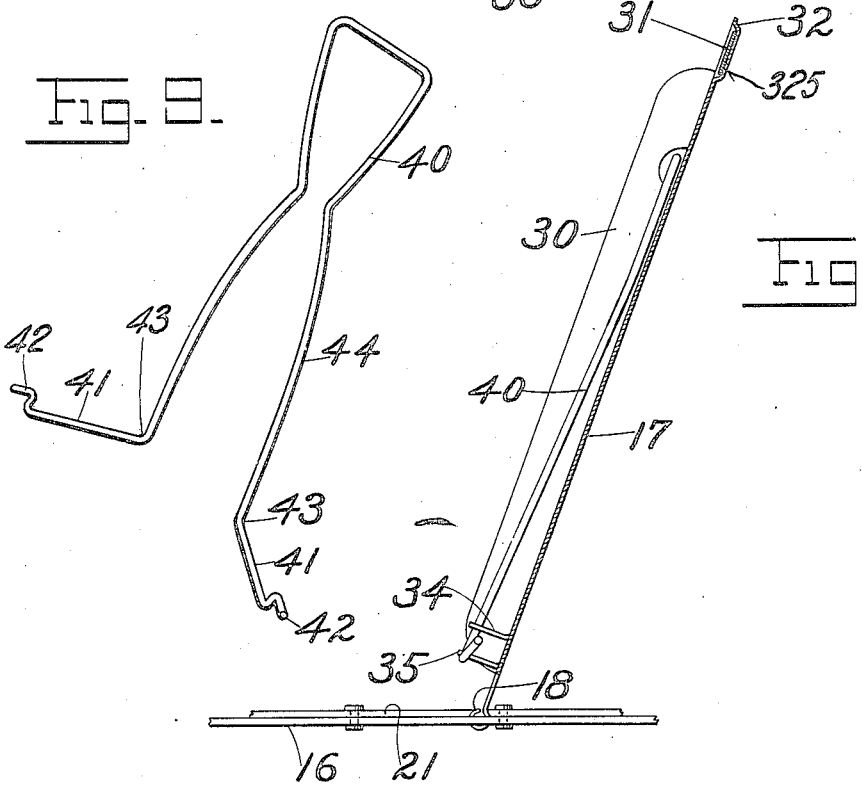

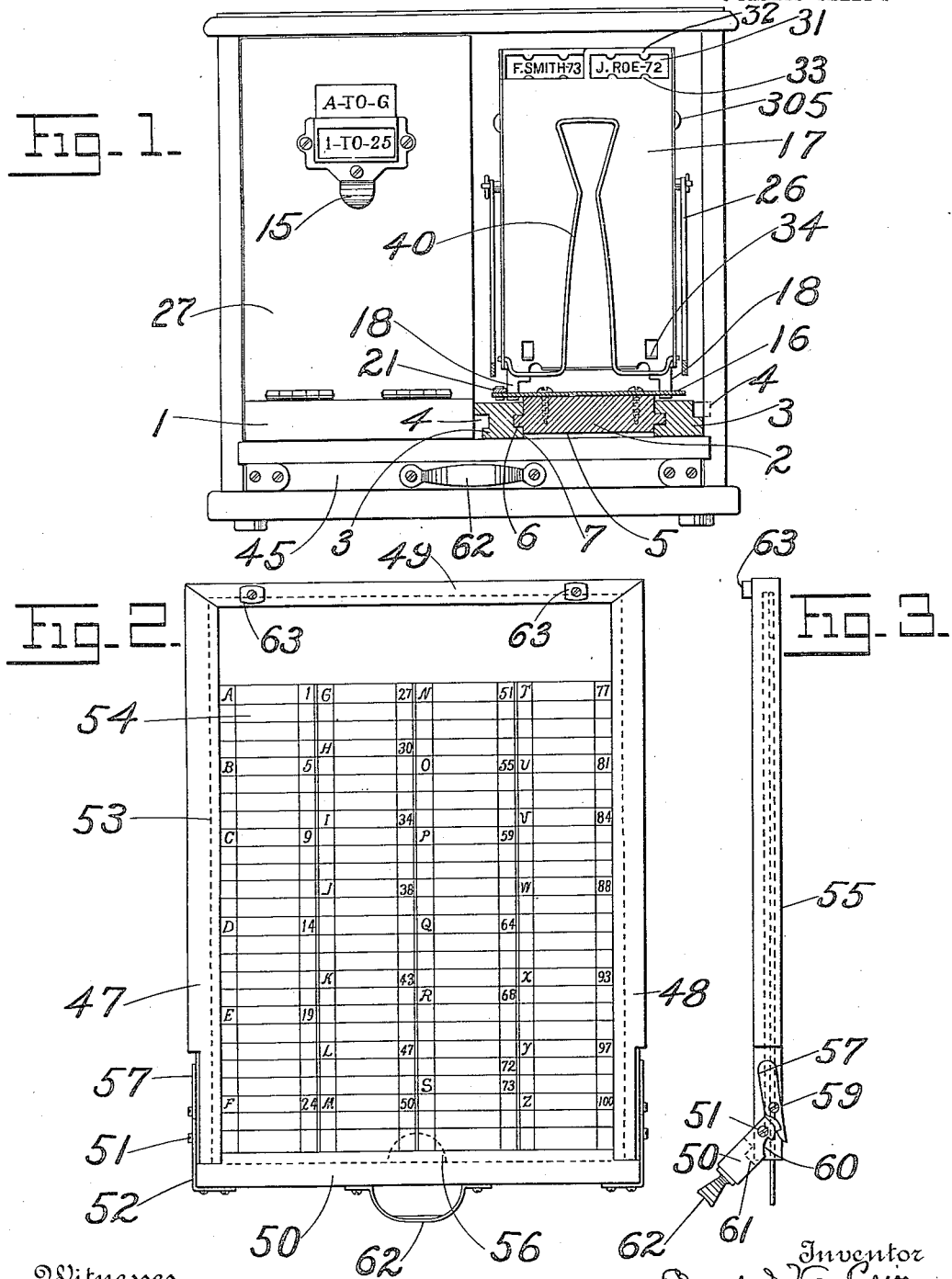

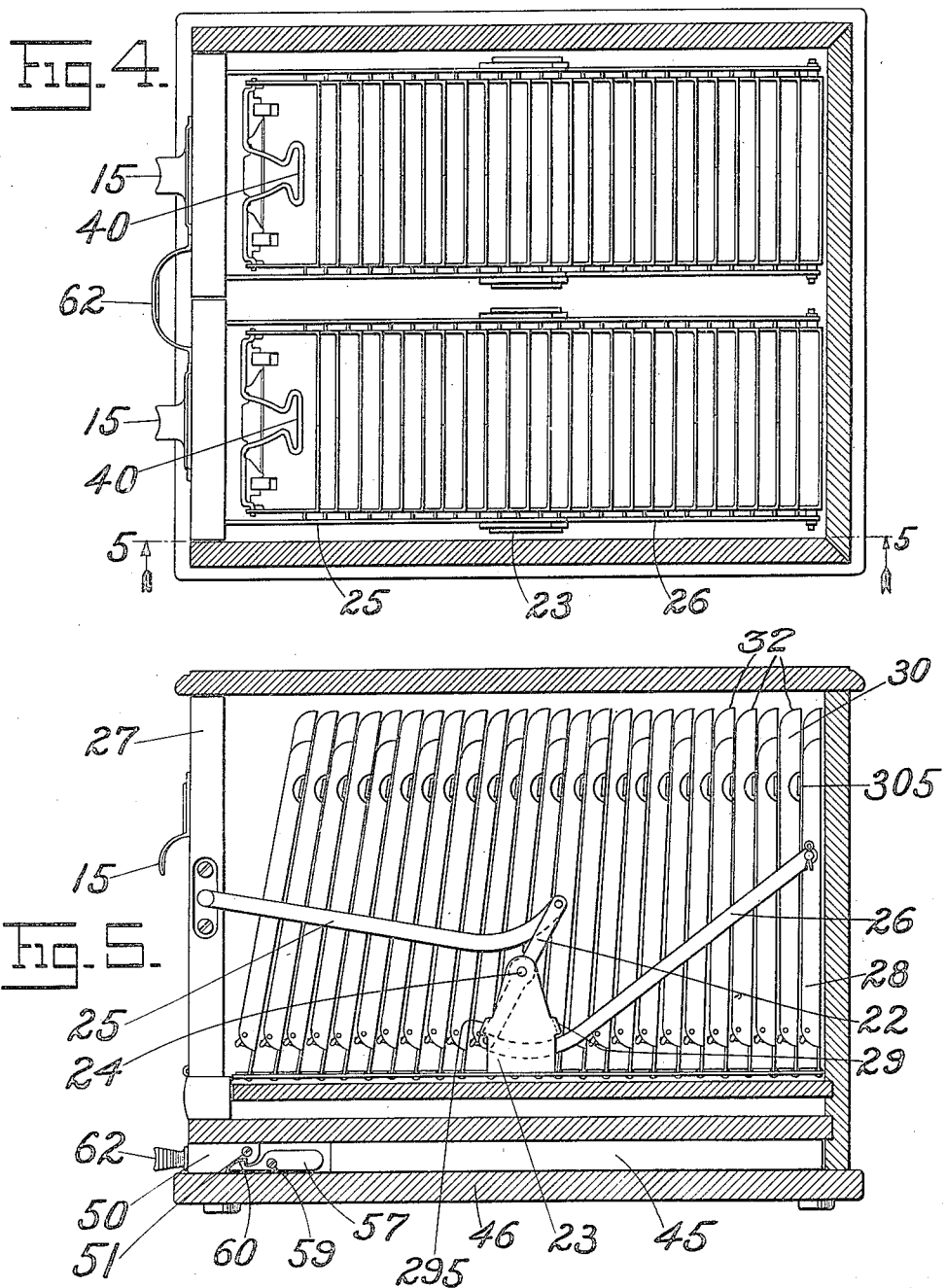

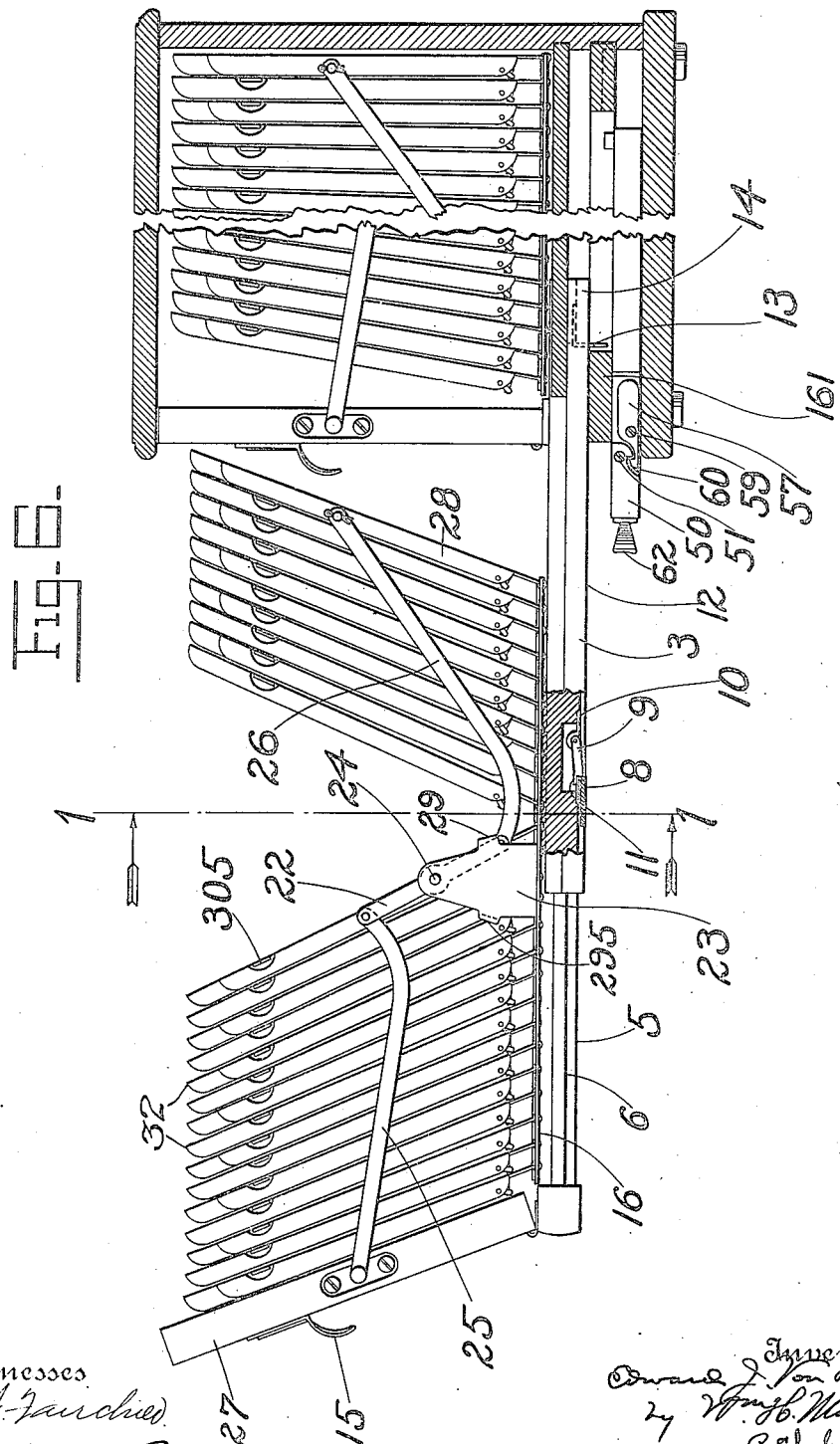

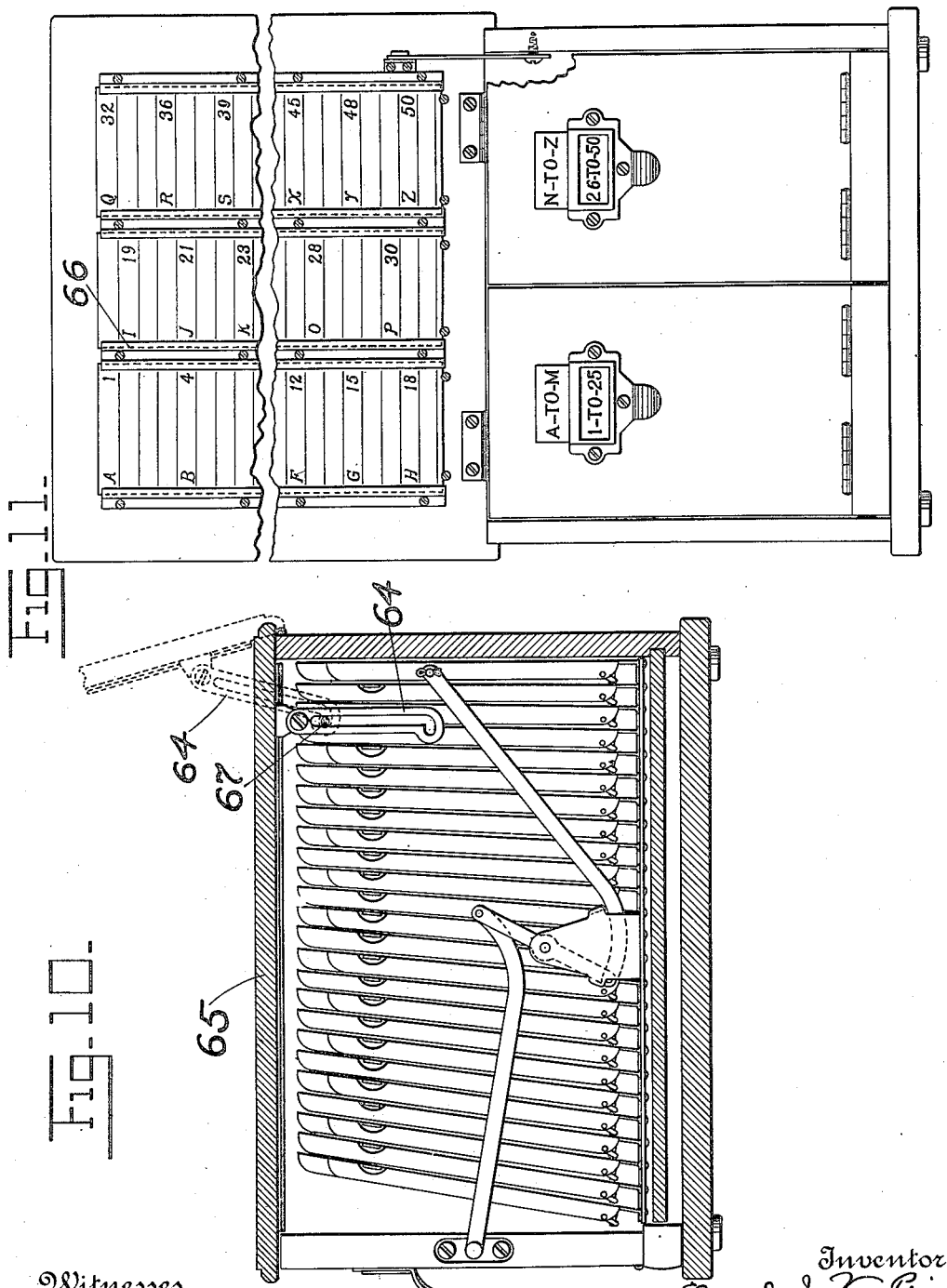

UNITED STATES PATENT OFFICE.

EDWARD J. VON PEIN, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CREDIT-CABINET.

1,134,248.    Specification of Letters Patent.    Patented Apr. 6, 1915.

Application filed September 10, 1909. Serial No. 517,177.

*To all whom it may concern:*

Be it known that I, EDWARD J. VON PEIN, a citizen of the United States, residing at Dayton, in the county of Montgomery and State of Ohio, have invented certain new and useful Improvements in Credit-Cabinets, of which I declare the following to be a full, clear, and exact description.

This invention relates to filing cabinets and has more particular relation to that class of filing cabinets which are employed to facilitate the keeping of accounts of credits, debits, individual monthly credit balances, delinquent accounts, etc.

The use of credit filing cabinets or appliances such as here illustrated is chiefly for the convenient and orderly filing of invoices, bills, slips or memoranda. By means of such cabinets, the original memoranda pertaining to sales, etc., are so filed that it is unnecessary to make additional entries in books.

The accounting system to which the present invention is peculiarly adapted is that which employs the well known form of sales slips, the original of which is delivered with a purchase to the customer and the carbon copy filed in the proprietor's file. These files generally consist of some form of individual receptacles for the separate accounts, these receptacles generally being provided with a suitable inclosing casing. In the present instance the file consists of a plurality of such individual receptacles mounted in drawers provided with a suitable inclosing casing.

The principal object of the present invention is to provide an improved form of individual receptacle including an improved form of spring clip for the sales slips.

Another object is to so simplify the construction of the receptacles and the method of mounting them in their containing drawers as to reduce the cost of manufacturing and assembling of the parts.

Another object is to provide an improved form of containing drawer which when closed will occupy a minimum amount of space, and when opened will permit ready access to any one of the receptacles.

A further object is to provide an index for facilitating the handling of the accounts and an improved form of holder for the same.

With these and incidental objects in view, the invention consists in certain novel features of construction and combinations of parts the essential elements of which are set forth in appended claims and a preferred form of embodiment of which is hereinafter shown and described with reference to the drawings which accompany and form part of the specification.

Of said drawings: Figure 1 is a front view of the filing cabinet, the front of one of the drawers being broken away to disclose one of the receptacles in upright position. Fig. 2 is a top plan view of the index and its holder. Fig. 3 is a side view of the index holder showing the automatic locking device for retaining the index card in its holder. Fig. 4 is a top plan view of the cabinet with the top of the cabinet removed. Fig. 5 is a side elevation taken on the line 5—5 of Fig. 4, disclosing the inclosed receptacles in the position assumed by them when the drawers are closed. Fig. 6 is a side view of the cabinet with one of the drawers drawn out to illustrate the method of tilting the drawer front and the consequent tilting of the receptacles to permit access to any desired receptacle. Fig. 7 is a detail top plan view showing the method of assembling the individual receptacles in the drawers. Fig. 8 is a detail side elevation of one of the individual receptacles. Fig. 9 is a view in perspective of the spring retaining clip for the sales slips. Figs. 10 and 11 show a modified form of index and holder for the same.

Referring to said drawings the above mentioned individual receptacles as shown in Figs. 7, 8 and 9 consist of the main body portions 17 having two upturned side flanges 30 bent therefrom to form a pocket or tray. Each of said trays has formed at its upper end an upwardly extending projection 32 formed with a depression 325 having lugs 33 struck therefrom to form a pocket for the reception of an index label 31 bearing the name of the customer to whose account the tray has been allotted, together with the index number of the tray.

Each tray is provided at its lower end with a forwardly extending flange 35 which is notched at 36 and 37 and each of the flanges 30 are provided with holes at 38 and 39 for the reception of a slip retaining clip 40, these holes being in a higher plane than the flange 35 and notches 36 and 37. The clips 40 are constructed of spring wire bent into an angular form such as shown in perspective in Fig. 9. These clips are mounted on the slip holders by bending the arms 41 of the clips rearwardly and inserting the ends 42 of the wire into the holes 38 and 39 of the side flanges and allowing the clip to engage the flange 35 at the angles 43 of the clip, the said angles engaging the flange at the notches 36 and 37. When the clip is thus placed in position there is a resultant torsional strain in the wire which will tend to cause the upper part 44 of the clip to press against the body portion 17 of the tray and thus hold in position any slips which have been inserted in the tray. To prevent any such slips becoming tangled in the lower part of the clip a pair of forwardly extending lugs 34 are struck from the body portion 17 just above the flange 35 and clear of the ends 42 of the clip wire. When the slips are placed in the tray their lower edges rest on these lugs and are thus held clear of the clip wire. Each tray is further formed at its lower end with two downwardly extending projections so bent as to form pivot eyes 18 for the purpose of mounting the trays in the drawers. As shown in Fig. 7 the trays are mounted on a metal sub-base 16 in the following manner; the sub-base 16 is provided with a plurality of U-shaped punchings 20 so shaped as to form the pivot pins 19. These punchings are arranged in pairs, each pair being appropriate to a certain tray and located to permit the insertion of the pivot eyes 18 of a tray into the enlarged portions of the U-shaped punchings. When the eyes have been so inserted into the punchings and are in a position in which they are in alinement with the pins 19, the trays are shifted laterally so that the eyes 18 will slip over the pins 19 to form a pivot for the tray. After a desired number of trays have been so mounted on the sub-base, a retaining strip 21 is riveted to the sub-base in such a position as to prevent a lateral re-shifting of any of the trays to cause their pivot eyes 18 to slip off their appropriate pivot pins 19.

After the trays have been assembled on the sub-base 16 in the above manner, the said sub-base may be secured to the base 5 of a containing drawer. In the present construction the sub-base is shown as rigidly mounted with screws to the base 5 but it will readily be seen that the mounting may be made detachable to permit the removal of the sub-base from its appropriate containing drawer. It will also readily be seen that any number of sets of trays may be mounted in a single drawer. Said drawer is mounted to slide in an inclosing casing and any number of such drawers may be provided to increase the capacity of the device. In the present instance two such containing drawers 1 and 2 have been provided but as the construction of both is identical, a description of a single drawer will suffice.

The containing drawer 2 as shown in Figs. 1 and 6 consists merely of the base 5 before mentioned and the front piece 27 hinged at its lower edge to the forward end of the base 5. To permit of the withdrawal of the drawer to its full length the base 5 is mounted to slide in a pair of channeled extension slides 3. These slides are of a well known construction and are provided with the grooves 7 which coöperate with the tongues 6 formed integral with the base 5. The slides 3 are further provided with grooves coöperating with tongues 4 mounted rigidly on the inclosing casing which tongues form suitable slide ways for the slides 3. The slides 3 are connected at their forward ends by the cross bar 8 which bar causes the said slides to move in unison. As shown in Fig. 6 this bar 8 also coacts with a gravity pawl 9 to limit the outward movement of the base 5 of the containing drawer. The said pawl 9 is pivotally carried by a metal plate 10 secured to the under side of the base 5, and is provided with a lug or projection 11 which extends over a portion of the plate 10 and prevents the pawl from dropping downwardly out of the plane of the bar 8. The pawl is pivoted to permit of a complete withdrawal of the drawer from the inclosing casing. If such action is desired it is merely necessary to raise the forward end of the pawl out of the plane of the bar 8. In replacing the drawer it will readily be seen that the pawl 9 will simply ride over and then drop down back of the bar 8 to again limit the movement of the drawer.

As shown in Fig. 6 the slides 3 may also be provided at their rear ends with the crosspiece 14 to which may be attached the downwardly extending arm 13. This arm 13 is adapted, in the movement of the slides, to strike against the stationary cross beam 161 of the inclosing casing and thus prevent a complete withdrawl of the slides from the casing. The drawers are further constructed so that when closed they occupy a minimum amount of space and the trays will assume an upright position with but little space for movement about their pivots. When, however, the drawer is drawn out and it is desired to refer to some account, it is desirable to have the tray containing such account assume a position in which the outermost sales slip bearing the more recent totals may be read by the operator without removing the slip from the tray. This is accomplished by the provision of means actuated upon the opening of the drawer for so tilting the front of the drawer and the rear end of the drawer or rearmost tray to give the trays a wider range of movement to permit of their assuming a position as shown in Fig. 6. This will leave sufficient space at the line 1—1 to permit of ready access to the first tray to the right of said line in the figure. It will readily be seen that any of the trays may be rocked by hand to assume a like position.

The tilting of the trays upon the opening of the drawer is accomplished in the following manner: As before stated the front 27 of the drawer is hinged at its lower edge to the forward end of its base 5. Pivotally connected at its forward end to said drawer front is a link 25, the rear end of which is pivotally connected to the upwardly extending arm of rocking beam 22. The beam 22 is pivotally mounted at 24 to the upright standard 23 rigidly mounted on the sub-base 16. Pivoted to the downwardly extending arm of said beam is a second link 26 the rear end of which is pivoted to the rearmost tray of the series.

It will readily be seen from the foregoing description that when the operator grasps the grip portion of the combined drawer pull and card index label 15 mounted on the front of the drawer, the said front will be tilted forward on its hinges. This forward tilting movement of the drawer front will, through the medium of the link 25, result in a corresponding tilting movement of the upper arm of the beam 22. This will result in a backward movement of the lower arm of the beam 22 and, through the medium of the second link 26, a backward tilt of the rearmost tray. The standard 23 is provided with the two lugs 29 and 295 formed integral therewith and extending into the path of movement of the downwardly extending arm of the beam 22 for the purpose of limiting the extent of rocking movement of the beam and thereby the tilting movement of the front of the drawer and rearmost tray. It is clear that a hinged rear end for the drawer, similar to its forward end, may be provided with the same result, but in the present instance such a construction has been dispensed with, and the link 26 has been connected to the rearmost tray for the purpose of economizing space. In the drawings two sets of connections between the front 27 and the rearmost tray have been shown but it is clear that a single set would reach the same results.

In order to prevent the telescoping of the trays in case any of the side flanges 30 should spread outward in rough handling, each tray is provided on either side with a laterally extending lug 305 struck from the said flanges.

As shown in Fig. 1, a combination desk board and index holder is slidably mounted in the inclosing cabinet just above its base and just below the drawers above described.

As shown in Figs. 2 and 3, said holder comprises the side pieces 47 and 48, the end pieces 49 and 50 and base board 55. The side pieces 47 and 48 and the end piece 49 are grooved as indicated at 53 for the reception of an index card 54 and a glass plate for protecting the index card. The base board 55 is provided with a cut away portion 56 to facilitate the removal of the index card.

In its normal position the front end piece 50 tends to close the forward end of grooves 53 to prevent the removal of the index card. Said piece 50, however, is provided at either side with the angle plates 52 and is pivoted at 51 to the side pieces 47 and 48 and is adapted to be rocked upward to permit the withdrawal of the index card. Such rocking movement is prevented, however, by reason of the engagement of locking notches 60, formed in the angle plates 52, by the hook shaped forward ends of gravity pawls 57 pivoted at 59 to the side pieces. The pawls are normally held in locking engagement and the front end piece 50 closed, by reason of the weight of the rear ends of said pawls. It will therefore be necessary to lift the rear ends of the pawls to destroy such locking engagement and permit of the upward rocking of the front piece 50. The index holder is further provided with a pair of rubber bumpers 63 to prevent the complete withdrawal of the index board from the casing.

Figs. 10 and 11 illustrate a modified form of index holder which is made by hinging the top cover 65 of the casing at its rear edge and providing the under side of said cover 65 with flanged ways 66 for holding any desired number of index cards. In this instance the cabinet is provided with a pair of pins 67 which coöperate with a pair of gravity arms 64 pivoted to the cover 65 to hold the cover in its open position. The construction and operation of this mechanism are obvious from the drawings.

While the form of mechanism herein shown and described is admirably adapted to fulfil the objects primarily stated, it is to be understood that it is not intended to confine the invention to the one form of embodiment herein shown and described as it is susceptible of embodiment in various forms all coming within the scope of the claims which follow.

What is claimed is as follows:

1. In a filing cabinet of the class described, the combination with means for receiving accounts, etc., consisting of a series of individual receptacles each formed with a main body portion and side flanges on an angle to the main body portion and having bearing holes formed therein near their lower ends, of a retaining means for record material mounted in each of said receptacles consisting of a spring wire bent into angular form and having its ends normally resting in said bearing holes and a bearing flange on an angle to the main body portion provided with notches adapted to engage said retaining means at certain of its angles, said bearing flange being in a lower plane than said bearing holes.

2. In a filing cabinet of the class described, the combination with means for receiving accounts, etc., consisting of a series of individual receptacles formed with a main body portion and side flanges on an angle to the main body portion and having bearing holes formed therein near their lower ends, of a retaining means for record material mounted in each of said receptacles and consisting of a spring wire having an angular form and having its ends normally resting in said bearing holes and a bearing flange on an angle to the main body portion provided with notches adapted to engage said retaining means at certain of its angles, said bearing flange being in a lower plane than said bearing holes, and supporting means for the record material comprising lugs on the main body portion projecting in a plane higher than said holes.

3. In a filing cabinet of the class described, the combination with an inclosing casing having a sliding drawer or receptacle therein, of means mounted in said drawer for receiving accounts said means comprising a series of individual receptacles having at their lower edges projections integral therewith and which form pivot eyes, means for mounting said individual receptacles in the drawer said mounting means consisting of a flat metal sub-base mounted on the base of the drawer and having a plurality of projecting pivot pins formed integral therewith in the plane of said base and adapted to coöperate with the said pivot eyes to form pivots for the individual receptacles and a retaining strip mounted on said sub-base to prevent a lateral shifting of the individual receptacles to cause the pivot eyes to slip off their appropriate pivot pins.

4. In a filing cabinet of the class described, the combination with an inclosing casing, of a sliding drawer or receptacle therein having its forward end hinged to tilt in a forward direction, means in said drawer for receiving accounts, said means consisting of a series of individual receptacles pivotally mounted on the base of said drawer and means connecting the forward end of the drawer and the rearmost individual receptacle to effect a simultaneous tilting of said end and receptacle in opposite directions.

5. In a filing cabinet of the class described, the combination with an inclosing casing, of a sliding drawer or receptacle therein having its forward end hinged to tilt in a forward direction, means in said drawer for receiving accounts, said means consisting of a series of individual receptacles pivotally mounted on the base of said drawer and means connecting the forward end of the drawer and the rearmost receptacle to effect a simultaneous tilting of said end and receptacle in opposite directions, said connecting means comprising a pair of levers one end of each being pivotally connected to said front end and said rearmost receptacle respectively, and a rocking arm connecting the opposite ends of said levers, said rocking arm being mounted on a rigid part of the drawer or receptacle.

6. In a filing cabinet, the combination with a receptacle having its forward end hinged to tilt in a forward direction, of a series of account receiving trays pivotally mounted in the receptacle, and means connecting the forward end of the receptacle and one of the trays for effecting the simultaneous tilting of the forward end of the receptacle and the tray in opposite directions.

7. In a filing cabinet, the combination with a receptacle having its forward end movable relative to the rest of the receptacle, of a series of account receiving trays movably mounted in the receptacle, and means connecting the movable portion of the receptacle with one of the trays for effecting the simultaneous movement of the forward end of the receptacle and the tray in opposite directions.

8. In a filing cabinet of the class described; a series of trays having integral eyes extending from their lower edges; and a base for supporting the trays having integral projections in the plane of the base forming pivots for the eyes, the base being recessed adjacent the pivots so as to permit assembling and disassembling of the trays and base.

9. In a filing cabinet of the class described; a series of trays having integral eyes extending from their lower edges; a base for supporting the trays having integral projections in the plane of the base forming pivots for the eyes, the base being recessed adjacent the pivots so as to permit assembling of the trays on the base; and means for preventing movement of the trays longitudinally in one direction thereby retaining the trays with their eyes over the pivots in the base.

In testimony whereof I affix my signature in the presence of two witnesses.

EDWARD J. VON PEIN.

Witnesses:
F. E. HAMILTON,
R. RUMMLER.